March 11, 1930.  I. H. JUDD  1,750,522
METHOD OF MANUFACTURING WHEEL SPIDERS
Original Filed Jan. 17, 1927   5 Sheets-Sheet 1
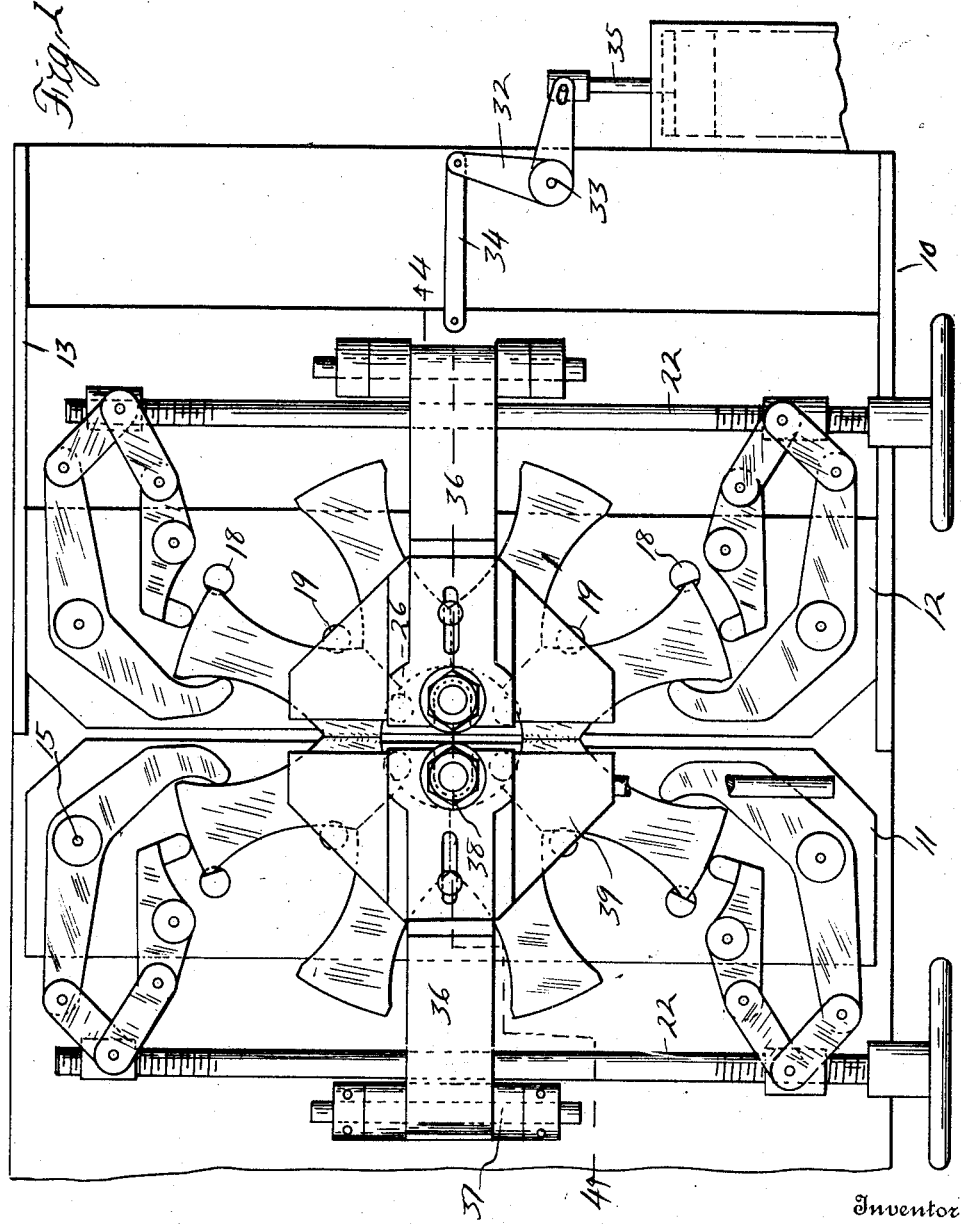
Inventor
Irving H. Judd
By Whittemore, Hulbert & Whittemore & Belknap
Attorneys

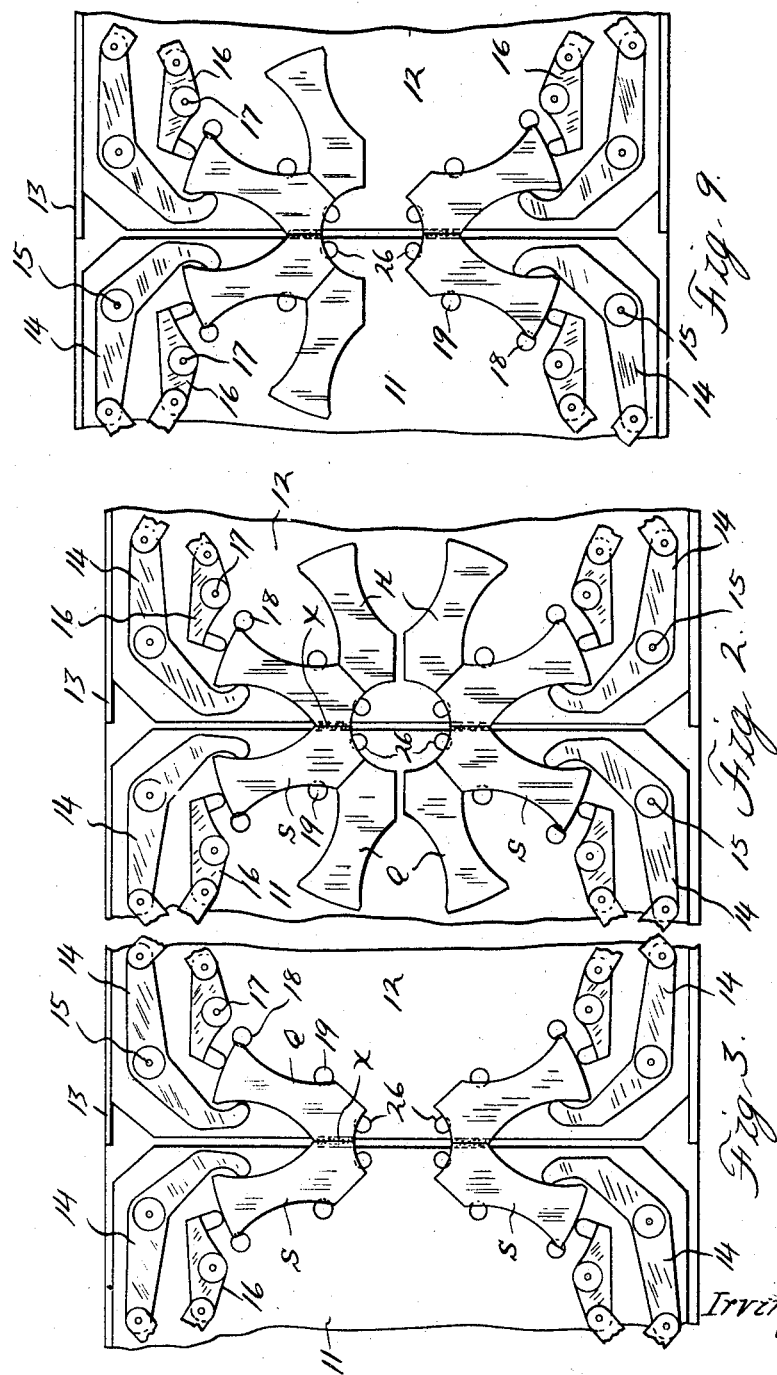

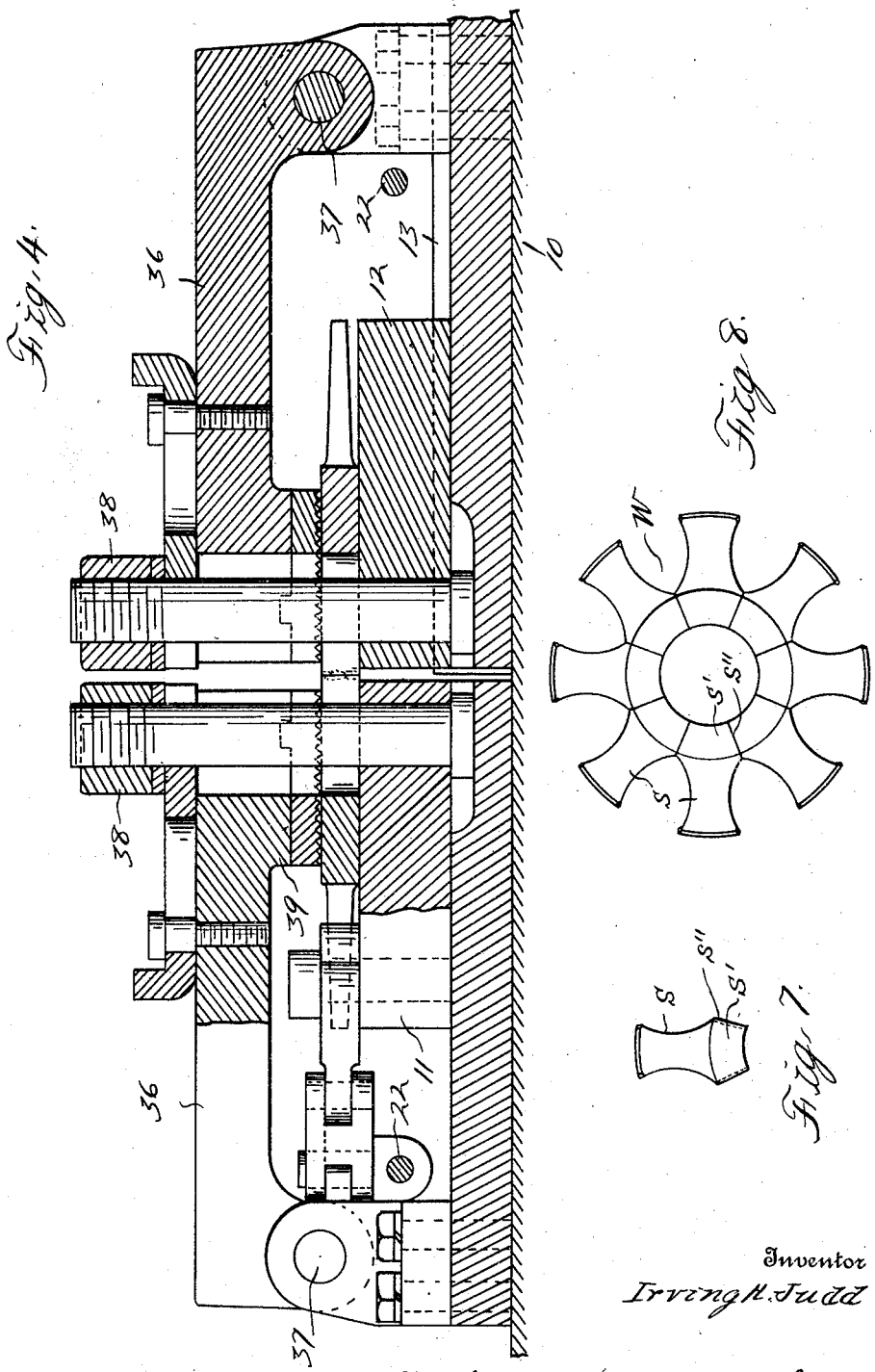

March 11, 1930.  I. H. JUDD  1,750,522
METHOD OF MANUFACTURING WHEEL SPIDERS
Original Filed Jan. 17, 1927    5 Sheets-Sheet 4
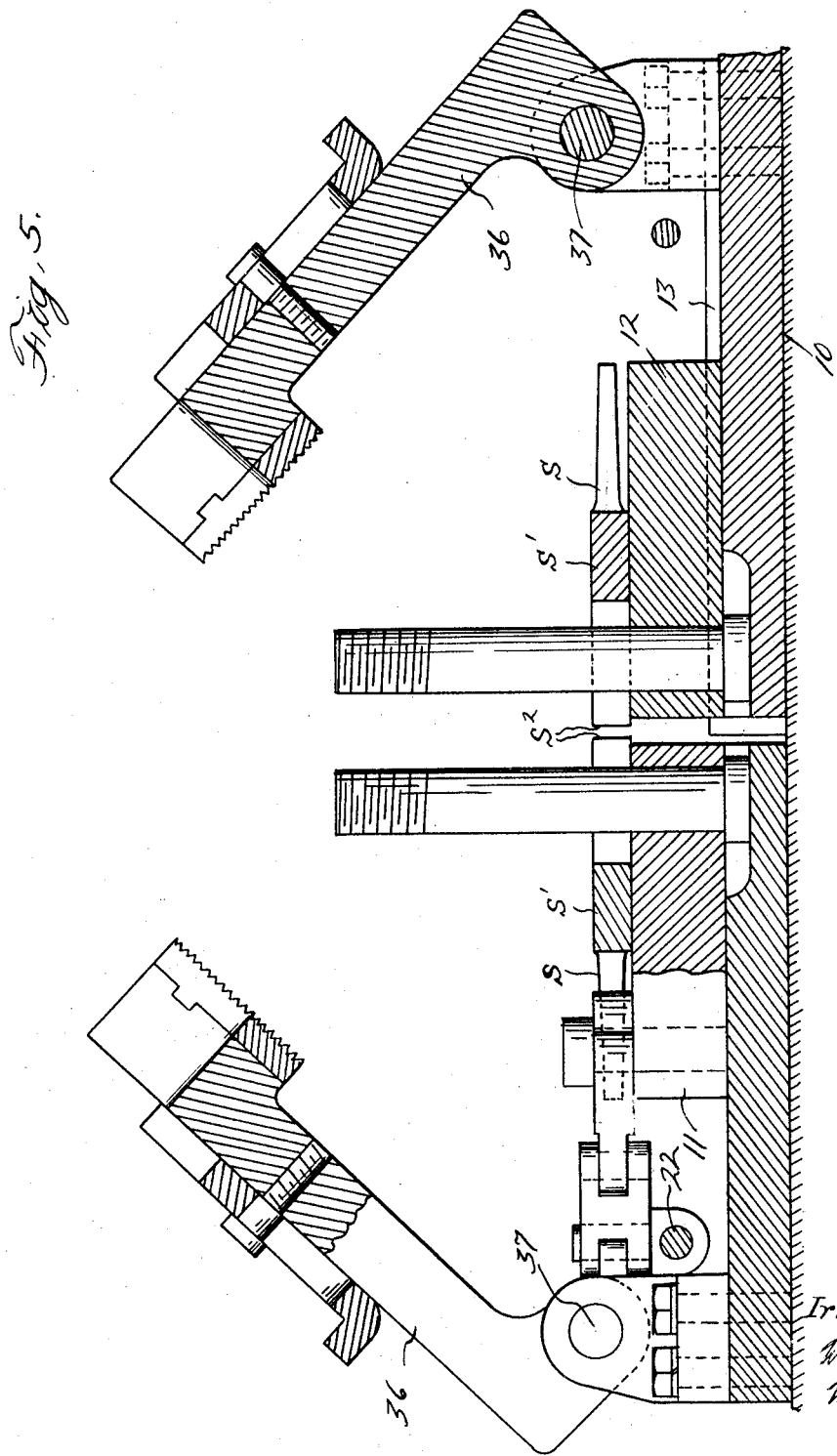
Inventor
Irving H. Judd
Attorneys March 11, 1930.    I. H. JUDD    1,750,522
METHOD OF MANUFACTURING WHEEL SPIDERS
Original Filed Jan. 17, 1927    5 Sheets-Sheet 5

Inventor
Irving H. Judd

Patented Mar. 11, 1930

1,750,522

UNITED STATES PATENT OFFICE

IRVING H. JUDD, OF DETROIT, MICHIGAN, ASSIGNOR TO WHITEHEAD AND KALES COMPANY, OF RIVER ROUGE, MICHIGAN, A CORPORATION OF MICHIGAN

METHOD OF MANUFACTURING WHEEL SPIDERS

Original application filed January 17, 1927, Serial No. 161,669. Divided and this application filed May 7, 1928. Serial No. 275,937.

This invention relates to wheel spiders and to the method of making the same and more particularly to wheel spiders comprising a plurality of separate spoke members united at the hub by flash-welding or butt-welding. As the well known flash-welding is a species of butt-welding and as the invention finds equal utility with either type of welding this operation will, for sake of convenience, be hereinafter referred to as butt-welding.

This application is a division of Serial No. 161,669 filed January 17, 1927.

The herein involved method of making wheel spiders contemplates the progressive assembling of the individual spokes, first into pairs or quarter sections where an eight-spoke spider is involved; the assembling of the pairs or quarters into halves and the assembling of the halves into wholes or complete spiders. The method contemplates uniting the individual spokes, the quarters and the halves by butt-welding operations and discloses a simple and efficient means of assembling and uniting wheel spiders in a rapid and economical manner.

The several steps of the method involved as well as the novel details of construction of the wheel spider and of the apparatus employed will become more apparent as this description proceeds, especially when considered in connection with the accompanying drawings, wherein:

Figure 1 is a fragmentary plan view of a conventional form of welding machine showing the work holding fixtures in plan view;

Figure 2 is a fragmentary view similar to Figure 1 showing the work holding fixtures engaging quarter sections of the wheel spider;

Figure 3 is a fragmentary view similar to Figure 1 showing the work holding fixtures engaging single spoke sections of the wheel spider;

Figure 4 is a vertical sectional view taken substantially on the plane indicated by line 4—4 on Figure 1;

Figure 5 is a view similar to Figure 4 showing the work clamping means in inoperative position;

Figure 7 is an elevational view of one of the spokes;

Figure 8 is an elevational view of the completed spider; and

Figure 9 is a view similar to Figure 3 showing the work holding fixtures engaging singles and quarters.

Figure 6:
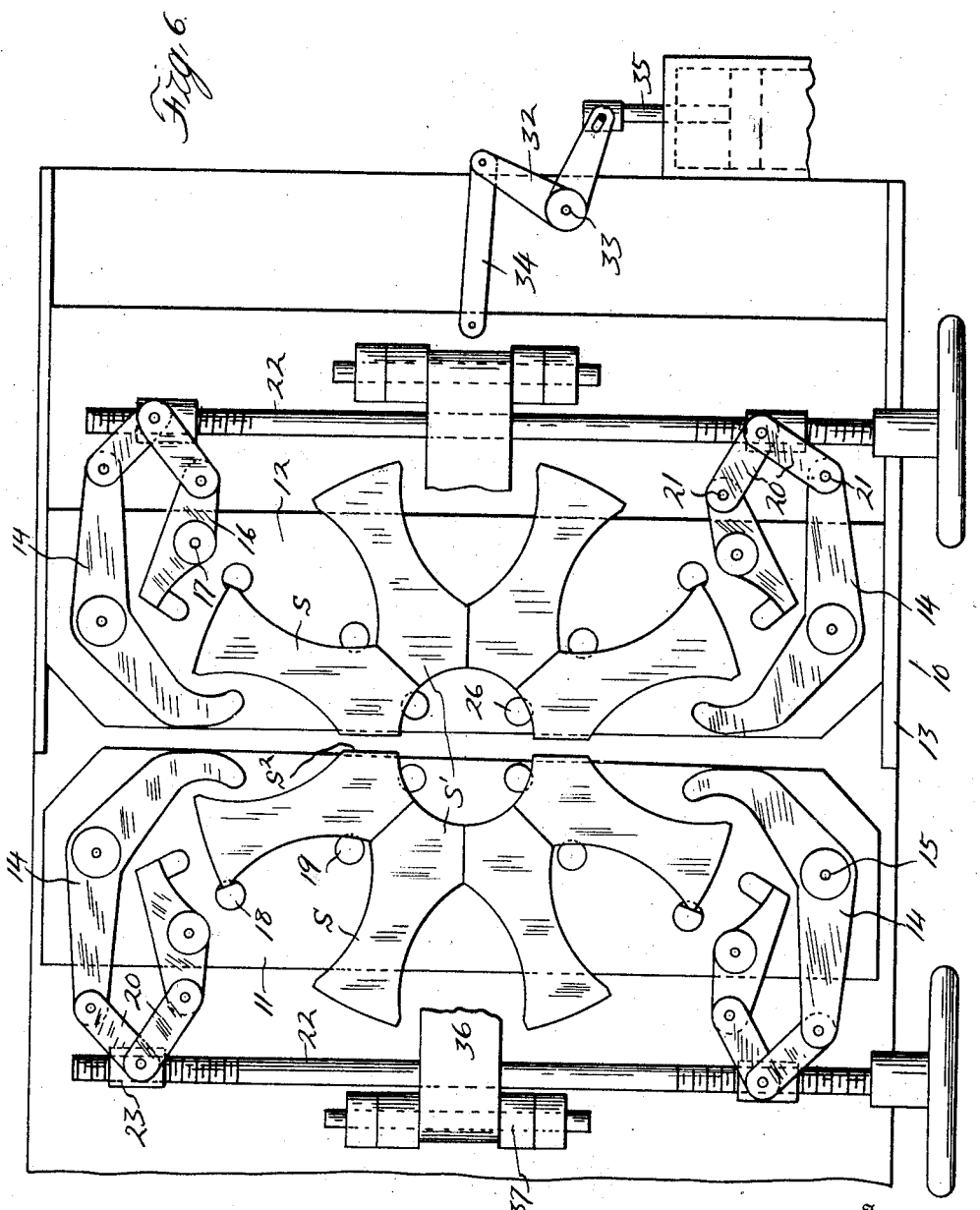
Figure 6 is a view similar to Figure 1 showing the work positioning arms in inoperative position.

Referring now particularly to the drawings wherein like reference characters indicate like parts it will be noted that there is illustrated, particularly in Figure 1, a conventional form of welding machine 10 upon which stationary and movable work holding fixture plates 11 and 12 respectively are mounted. The movable fixture plate 12 is slidable toward and from the stationary plate 11 along guides 13 provided on the welding machine base.

By referring more particularly to Figures 7 and 8 it will be understood that the problem involved is that of constructing a wheel spider from a plurality of spoke members S, each of which is provided with a hub portion S' of segmental shape in plan view, the end faces S'' of which are adapted to be butt-welded to the end faces of the next adjacent spoke member to form the completed wheel spider W.

By referring particularly to Figures 1 to 3 inclusive it will be noted that the work holding fixtures each comprise a plurality of articulated levers arranged in cooperative relation one to another and also cooperating with a plurality of fixed stops. More specifically, each fixture includes a pair of main bell crank levers 14 pivotally mounted as at 15 to their respective plates 11 or 12 and a pair of relatively smaller or shorter bell crank levers 16 pivotally mounted as at 17 on the plates 11 and 12. Projecting upwardly from each of the plates 11 and 12 are pairs of spaced stops or abutments 18 and 19 engageable respectively adjacent the outer free and inner hub ends of the spoke members. The bell crank levers 14 and 16 are arranged in pairs with one end of each of these levers connected by a pair of links 20 pivotally connected thereto as at 21. These links provide means for simultaneously rocking each pair of bell crank levers 14—16 and are operable by means of rotatable screws 22 each provided with a pair of oppositely travelling elements or nuts 23 to which the free ends of the links 20 are pivotally connected as at 24. Thus, upon a rotation of screws 22 by means of handles 25 the travelling nuts 23 will be displaced longitudinally and through links 20 will rock bell crank levers 14 and 16 so as to cause the free ends thereof to engage respectively against the outer and side edges of adjacently positioned spokes S. This holds the spokes in engagement with the adjacent pair of fixed stops 18 and 19 and also against fixed stop pins 26 so that they are rigidly held in the position illustrated in the drawings. The system of levers and links as just described is duplicated upon the fixed and movable fixture plates 11 and 12 as will be apparent. The means for moving plate 12 toward and from fixed plate 11 includes a bell crank lever 32 pivotally mounted as at 33 and connected on the one hand by the means of a link 34 to the plate 12 and on the other hand to an operating mechanism 35 here shown as a cylinder and piston. It is obvious, however, that any other operating means such, for instance, as a manually controlled handle may be substituted for the cylinder and piston illustrated. As the bell crank lever is rocked in one direction it will move fixture plate 12 toward plate 11 and as this bell crank lever is rocked in the other direction movable fixture plate 12 will be moved away from plate 11.

Associated with each fixture plate is a swinging top clamp 36 pivotally mounted as at 37 and adapted to be swung downwardly into engagement with the top surface of the spokes or spider sections and to be secured in clamping position by means of nuts 38 threaded upon studs projecting upwardly from the fixture plates. Lateral extensions 39 carried by the clamping member 36 are provided for engaging the spokes spaced from the longitudinal center of the apparatus.

In Figure 3, two pair of spokes S are shown as being welded along the lines X so that upon this welding operation four spoke members S are welded into twin spoke sections or quarters Q.

In Figure 2, four quarters Q are mounted upon the fixture plates and are being welded along the lines X so that after this welding operation four quarters have been formed into two halves H. The two halves are shown supported by the fixture plates in Figure 1 and being welded along the lines X to produce the whole or completed spider W illustrated in Figure 8.

It will be understood that in each of the three welding operations the units to be connected are mounted respectively upon the fixtures 11 and 12 whereupon the movable fixture 12 is moved toward the stationary fixture 11 to bring the edge portions $S^2$ into engagement whereupon the parts are butt-welded along the lines X as indicated. It has been found that in practice the same fixture plates 11 and 12 may be employed in connection with the operations illustrated in Figures 1 and 3 but that the operation in Figure 2 requires a slightly different positioning of the fixed stops 18, 19 and 26 so that for this purpose one of each of these stops must be made adjustable if all of the operations are to be performed upon the same machine, or slightly altered fixture plates employed in connection with the second operation. However the same fixture plate as shown in Figures 1 and 3 could also be used in the operation shown in Figure 2 without being handicapped by the position of the stop pins 18, 19 and 26 by welding one pair of quarters Q and one pair of spokes S.

In Figure 9, I have illustrated the fixtures shown in Figures 1 and 3 as capable of uniting various combinations of spokes. As shown in Figure 9 the fixtures are capable of welding simultaneously a pair of single spokes to form a quarter and a pair of quarter sections to form a half. It will further be noted from Figure 9 that the fixtures illustrated therein are also capable of welding two halves to form a complete wheel spider. For accomplishing the foregoing results two pair of individual spokes are placed upon the fixtures in substantially the same manner as pointed out in connection with Figure 3 and welded along the lines X in Figure 3 to form two quarters Q. One of the quarters are then rotated through substantially 45° and the remaining quarter section placed adjacent thereto as illustrated in the upper portion of Figure 9. If desired, another pair of individual spokes may be placed opposite the two adjacent quarter sections as shown in the lower portion of Figure 9. The individual spokes together with the quarter sections Q are then simultaneously welded along the line $x$ in Figure 9 forming a quarter section and a half section. The quarter section may then be taken from the fixture and the half section moved or rotated through substantially 90° to position the same upon one of the fixtures. Another half section is then placed on the other fixture directly opposite the half section aforesaid as shown in Figure 1 of the drawings. The two half sections are then butt-welded forming a complete wheel spider.

The steps of the method herein involved are no doubt obvious from the preceding description. However, it will be noted that first single spokes are united by butt-welding to form quarter sections; that the quarter sections are united by butt-welding to form half sections; and that the half sections are united by butt-welding to form whole or completed wheel spiders. Obviously, however, wheel spiders comprising more or less than eight spokes may be assembled but in such an event the number of welding operations required will accordingly differ.

While the mechanical apparatus involved herein and described somewhat in detail has been found to render efficient and satisfactory results in practice, nevertheless, it should be understood that various other types of apparatus may be employed with equal facility without in any wise affecting the method herein involved or the article produced. To this end reservation is made to make such changes in the method and in the details of construction of the article and the apparatus as may come within the purview of the accompanying claims.

What I claim as my invention is:

1. The method of manufacturing wheel spiders including the steps of arranging individual spokes in pairs on a table and welding the spokes of each pair together so that a plurality of quarter units are produced simultaneously, arranging a plurality of said quarter units as half units upon the table and welding together adjacent spokes of each quarter to form a plurality of half units simultaneously, and arranging two half units on the table and welding together adjacent spokes of said half units to form a complete spider.

2. The method of manufacturing wheel spiders including the steps of arranging individual spokes in pairs on a table and welding the spokes of each pair together so that a plurality of quarter units are produced simultaneously, and arranging a plurality of said quarter units as half units upon the table and welding together adjacent spokes of each quarter unit to form a plurality of half units simultaneously.

In testimony whereof I affix my signature.

IRVING H. JUDD.